No. 12,390. REISSUED SEPT. 12, 1905.
C. G. CURTIS.
ELASTIC FLUID TURBINE.
APPLICATION FILED AUG. 6, 1904.
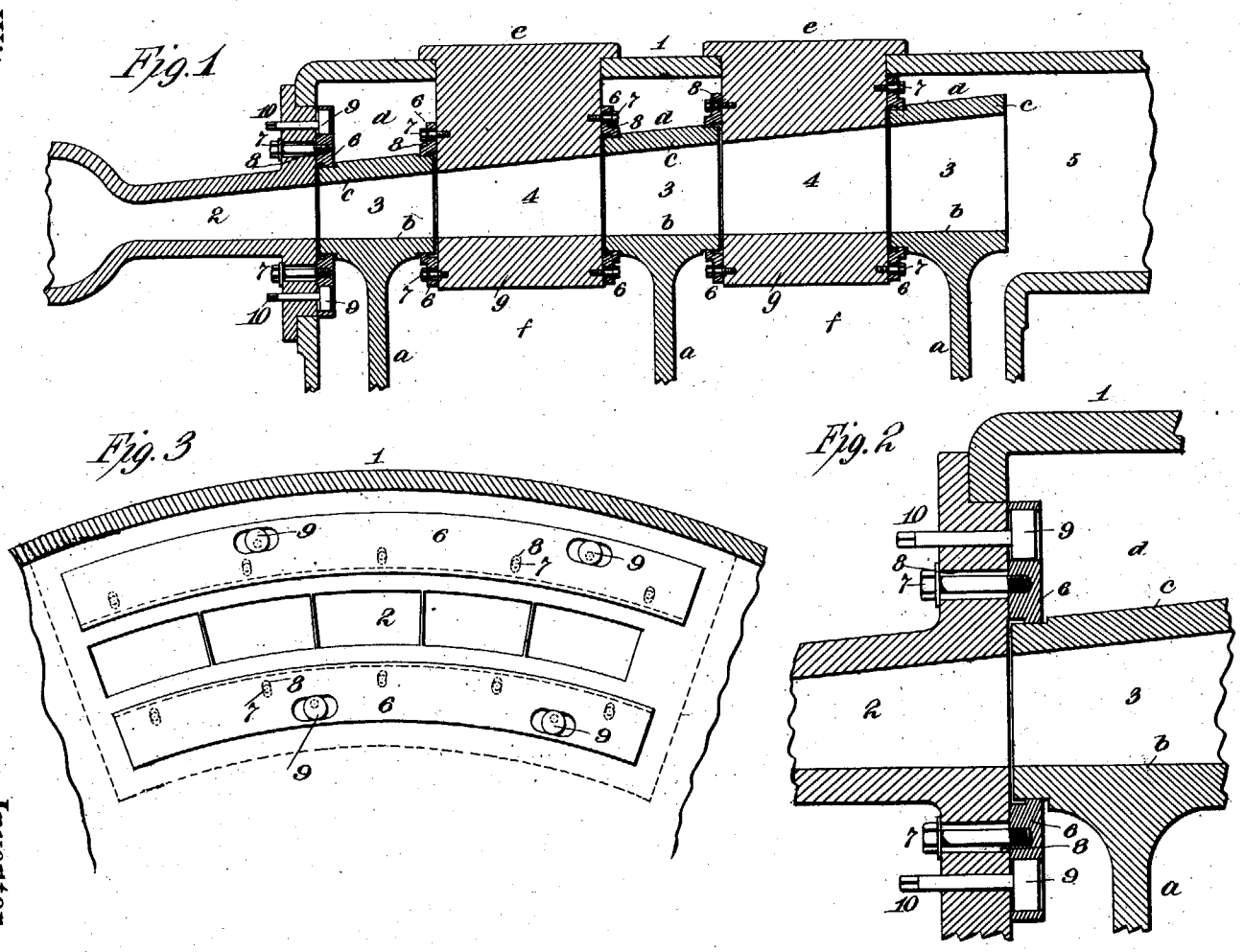
Witnesses:
Jas. F. Coleman
Geo. Robt Taylor
Inventor
Charles G. Curtis
By Dyer & Dyer
Attorneys.

UNITED STATES PATENT OFFICE.

CHARLES G. CURTIS, OF NEW YORK, N. Y., ASSIGNOR, BY MESNE ASSIGNMENTS, TO THE CURTIS STEAM TURBINE COMPANY, A CORPORATION OF WEST VIRGINIA.

ELASTIC-FLUID TURBINE.

No. 12,390. Specification of Reissued Letters Patent. Reissued Sept. 12, 1905.

Original No. 726,032, dated April 21, 1903. Application for reissue filed August 6, 1904. Serial No. 219,782.

*To all whom it may concern:*

Be it known that I, CHARLES G. CURTIS, a citizen of the United States, residing in the borough of Manhattan, city of New York, State of New York, have invented a certain new and useful Improvement in Elastic-Fluid Turbines, of which the following is a description.

My present invention relates to means for reducing the leakage at the clearances of elastic-fluid turbines, and particularly in that class of turbines disclosed by my Patent No. 566,968, dated September 1, 1896, wherein the velocity of the elastic fluid is fractionally abstracted by directing it two or more times successively against moving buckets. In turbines of this character the pressure is not entirely converted into velocity by the expansion-nozzle; but some pressure above that of the exhaust is retained in the elastic fluid at the point of delivery by the nozzle to the first set of revolving buckets and also to a less extent at subsequent clearances, resulting in leakage. Leakage of the elastic fluid is obviously reduced by making the clearances between the moving and stationary elements of the turbine as small as possible. In practice, however, and especially in turbines of large diameter, it is found impossible to make the revolving parts run perfectly true on their side faces or, if constructed to run true, to remain true during use, and it is also desirable and practically essential that more or less end play of the shaft carrying the revolving buckets should be permitted. Hence in operation the revolving parts of the turbine necessarily have more or less lateral movement toward and away from the stationary parts, increasing and decreasing the width of the clearances and permitting a serious leakage of the elastic fluid thereat.

The object of my present invention is to provide means whereby this leakage may be very materially reduced.

It is a fact that the cylindrical surfaces of the revolving parts of an elastic-fluid turbine, between which the revolving buckets are located, when once made true will remain approximately true in use, and this is so independently of the end play of the shaft. I utilize this fact by constructing the turbine so that the meeting sides of the stationary and revolving elements of the turbine shall overlap each other on lines concentric with the axis of rotation, whereby the clearances will be transferred from the side faces of the parts to the cylindrical surfaces. Owing to the high velocity of the revolving parts in turbines of this character, it is not practicable to use ordinary forms of packing between the moving and stationary surfaces. In order to reduce the width of the clearances, which are transferred from the side faces to the cylindrical surfaces, as already stated, and to provide means of adjustment, so as to secure at all times the minimum separation, I provide ring-segments or lips, which are attached to the nozzle, and preferably, also, to the other stationary elements, and which overlap the cylindrical surfaces of the rotating elements throughout so much of the circumference as is necessary to cover the buckets in the line of the flow of the elastic fluid. These lips are set in such close proximity to the moving cylindrical surfaces that the virtual clearances are thereby reduced to a minimum. The lips may be made adjustable with respect to the revolving cylindrical surfaces, with which they coöperate, so as to secure the necessary preliminary accuracy of fit and so as to take up any subsequent wear and also to provide for the readjustment of the lips when the position of the axis of rotation of the moving elements is changed from any cause—as, for instance, by the wear or relining of the bearings. I have also found it desirable to make these lips of brass or some metal softer than the steel of which the rotating cylindrical surfaces are constructed, so that if desired the lips may be adjusted into actual contact with the cylindrical surfaces and will quickly wear clear of contact without cutting the cylindrical surfaces.

In the drawings, Figure 1 is a vertical section through the nozzle and the moving and stationary buckets of a turbine of the type referred to equipped with my present improvement in one of its forms and showing the employment of three sets of rotating buckets and two sets of intermediate stationary buckets. Fig. 2 is a section on a larger scale, showing the construction for reducing the clearances between the end of the nozzle and the first set of revolving buckets; and Fig. 3 is an elevation of the delivering end of the nozzle with the lips attached thereto.

1 represents the shell of an elastic-fluid turbine.

2 is an expansion-nozzle of any suitable type for converting the pressure of the elastic fluid into velocity and for directing the fluid against the first set of revolving buckets. The nozzle illustrated is the sectional nozzle described in my application, Serial No. 666,379, filed January 12, 1898.

3 3 3 are the revolving buckets, all carried on disks or wheels *a*, supported on the shaft. The vane-passages formed by the buckets 3 are closed on their inner side by the rims *b* of the disks or wheels, and on their outer side by covers *c*. The diameter of the shell 1 is greater than that of the revolving disks or wheels and the buckets carried by them, leaving a chamber *d* between the bucket-covers *c* and the curved wall of the shell. The function of this chamber is to avoid the necessity for finishing the inner curved surfaces of the shell, and it also serves to avoid any water-brake action between the bucket-covers and the shell, which might occur if these surfaces were brought close together.

4 4 are the intermediate stationary buckets, carried on blocks *e*, as shown, formed integral with or attached to the cylindrical portion of the shell and projecting inwardly therefrom into the chamber *d*. 5 represents the exhaust-opening. A chamber *f* is also formed between the covers *g* of the stationary buckets and the shaft.

6 6 are the ring-segments or lips for transferring the clearances from the side faces to the cylindrical surfaces of the rotating elements. They are strips having any suitable form in cross-section and having a length sufficient to cover the buckets in the line of flow of the elastic fluid. They also have the proper curvature to fit the cylindrical surfaces of the moving elements, between which cylindrical surfaces the revolving buckets are located. The lips are preferably made of brass or some other metal softer than steel. The lips may be secured in place by means of bolts or screws 7, which pass through slots 8 in the lips, so that such lips can be adjusted toward and away from the cylindrical surfaces. Means may also be provided for adjusting the lips during the running of the turbine. This is particularly desirable with regard to the lips, which are located at the clearances between the nozzle and the first set of revolving buckets. For this purpose cams 9, bearing against the lips and carried by shafts 10, projecting through the flange of the nozzle to the outer side of the turbine, may be used. To adjust the lips while the turbine is in operation, the screws 7 will be slightly loosened and the cams 9 turned so as to force the lips against or close to the revolving cylindrical surfaces, when the screws 7 will be again tightened to hold the lips in place. In constructing the turbine the revolving cylindrical surfaces over which the lips lap will be turned as true as possible after the wheels are finished. After the shaft has been properly mounted in the shell the lips will be adjusted close to or into light contact with the adjacent rotating cylindrical surfaces and will then be secured tightly in position by the screws or bolts 7. When the turbine is started, if the lips are then touching the wheels will at once wear themselves clear, so that the clearance will then be a minimum and the leakage will be as small as possible.

It will be observed that one set of the ring-segments or overlapping curved projections 6 is located in the chamber *d* between the wheels and the curved wall of the shell, reducing the leakage into this chamber from the clearances between the rotating and stationary elements, while the other set of these ring-segments or overlapping curved projections is located on the inner side of the clearances between the rotating and stationary elements—*i. e.*, between these elements and the shaft of the turbine—reducing the leakage from these clearances into the central spaces *f* around the shaft.

What I claim is—

1. In an elastic-fluid turbine, the combination with a rotating wheel having a rim pierced laterally by vane-passages, and a stationary element adjoining one side of such rim and delivering the elastic fluid to or receiving it from the revolving vane-passages parallel with the axis of such wheel, of a cylindrical surface on the outer or inner side of said rim and adjoining such stationary element, and a concentric lip attached adjustably to such stationary element overlapping such cylindrical surface and having a small clearance therefrom, substantially as set forth.

2. In an elastic-fluid turbine, the combination with a rotating wheel having a rim pierced laterally by vane-passages, and a stationary element adjoining one side of such rim and delivering the elastic fluid to or receiving it from the revolving vane-passages parallel with the axis of such wheel, of cylindrical surfaces both on the outer and inner sides of said rim and adjoining such stationary element, and concentric projections from such stationary element overlapping such cylindrical surfaces and having a small clearance therefrom, substantially as set forth.

3. In an elastic-fluid turbine, the combination with a rotating wheel having a rim pierced laterally by vane-passages, and a stationary element adjoining one side of such rim and delivering the elastic fluid to or receiving it from the rev lving vane-passages parallel with the axis of such wheel, of cylindrical surfaces both on the outer and inner sides of said rim and adjoining such stationary element, and concentric lips attached adjustably to such stationary element overlapping such cylindrical surfaces and having a small clearance therefrom, substantially as set forth.

4. In an elastic-fluid turbine, the combination with a rotating wheel having a rim pierced laterally by vane-passages, and a stationary element adjoining one side of such rim and delivering the elastic fluid to or receiving it from the revolving vane-passages parallel with the axis of such wheel, of a cylindrical surface on the outer or inner side of said rim and adjoining such stationary element, and a concentric lip attached adjustably to such stationary element and overlapping said cylindrical surface, such lip being of softer metal than such rim so that such lip when adjusted to touch such surface will wear out of contact therewith, substantially as set forth.

5. In an elastic-fluid turbine, the combination with the shell, a rotating wheel therein having a rim pierced laterally by vane-passages, and a delivery-nozzle entering the shell in line with such vane-passages, of ring-segments projecting from said nozzle over said wheel-rim, whereby the clearances between the nozzle and rotating vanes in the line of the flow of the elastic fluid will be transferred from the radial to the cylindrical surfaces, substantially as set forth.

6. In an elastic-fluid turbine, the combination with two sets of axial-flow rotating vanes and a set of stationary vanes carried by a block between such rotating vanes, of ring-segments projecting from such stationary vane-block over such rotating vanes, whereby the clearances between the rotating and stationary vanes in the line of flow of the elastic fluid will be transferred from the radial to the cylindrical surfaces, substantially as set forth.

7. In an axial-flow elastic-fluid turbine, the combination with the shell and two or more sets of rotating vanes therein, of a nozzle entering the shell in line with one set of rotating vanes, stationary vanes carried by blocks between the sets of rotating vanes and in line with said nozzle, and ring-segments projecting from such nozzle and stationary vane-blocks over said rotating vanes, whereby the clearances in the line of flow of the elastic fluid will be transferred from the radial to the cylindrical surfaces, substantially as set forth.

8. In an elastic-fluid turbine, the combination with the shell, a rotating wheel therein carrying lateral vane-passages, and a delivery-nozzle entering the shell in line with such vane-passages, of curved projections at the adjoining faces of the nozzle end and wheel-rim overlapping axially the adjoining part, whereby the clearances between the nozzle and rotating vanes will be transferred from the radial to the cylindrical surfaces, substantially as set forth.

9. In an elastic-fluid turbine, the combination with two sets of axial-flow rotating vanes, and a set of stationary vanes between such rotating vanes, of curved projections at the adjoining faces of the stationary and rotating vanes overlapping axially the adjoining part, whereby the clearances between the rotating and stationary vanes will be transferred from the radial to the cylindrical surfaces, substantially as set forth.

10. In an axial-flow elastic-fluid turbine, the combination with the shell and two or more sets of rotating vanes therein, of a nozzle entering the shell in line with one set of rotating vanes, stationary vanes located between the sets of rotating vanes and in line with said nozzle, and curved projections at the adjoining faces of the nozzle and rotating vanes and of the rotating and stationary vanes overlapping axially the adjoining part, whereby the clearances of the elastic fluid will be transferred from the radial to the cylindrical surfaces, substantially as set forth.

11. In an axial-flow elastic-fluid turbine, the combination with the shell, relatively rotating elements within said shell, and a chamber between the outer clearances and the curved wall of the shell, of a curved projection located in said chamber at the adjoining faces of the relatively rotating elements and overlapping axially the outer clearances between such elements, substantially as and for the purpose set forth.

12. In an axial-flow elastic-fluid turbine, the combination with the shell, relatively rotating elements within the shell, and a chamber between the inner clearances and the shaft, of a curved projection located in said chamber at the adjoining faces of the relatively rotating elements and overlapping axially the inner clearances between such elements, substantially as and for the purpose set forth.

13. In an axial-flow elastic-fluid turbine, the combination with the shell, relatively rotating elements within the shell, a chamber between the outer clearances and the curved wall of the shell, and a chamber between the inner clearances and the shaft, of curved projections located in both said chambers at the adjoining faces of the relatively rotating elements and overlapping axially both the outer and inner clearances between such elements, substantially as and for the purpose set forth.

14. In an axial-flow elastic-fluid turbine, the combination with the shell, a set of rotating vanes therein, a chamber between the rotating vanes and the curved wall of the shell, and a nozzle entering the shell and delivering the elastic fluid to the rotating vanes, of a curved projection located in said chamber between the rotating vanes and the curved wall of the shell at the adjoining faces of the nozzle end and rotating vanes and overlapping axially the clearance between the nozzle end and the vanes, substantially as and for the purpose set forth.

15. In an axial-flow elastic-fluid turbine, the combination with the shell, a set of rotating vanes therein, and a nozzle entering the shell and delivering the elastic fluid to the rotating vanes, of a curved projection overlapping axially the clearance between the nozzle and the rotating vanes on the inner side of such elements, substantially as and for the purpose set forth.

16. In an axial-flow elastic-fluid turbine, the combination with the shell, a set of rotating vanes therein, a chamber between the rotating vanes and the curved wall of the shell, and a nozzle entering the shell and delivering the elastic fluid to the rotating vanes, of curved projections located at the adjoining faces of the nozzle end and the rotating vanes both in said chamber between the rotating vanes and the curved wall of the shell and on the inner side of the nozzle and vanes and overlapping axially both the inner and outer clearances between the nozzle and vanes, substantially as and for the purpose set forth.

17. In an axial-flow elastic-fluid turbine, the combination with the shell, rotating and stationary vanes therein, and a chamber between the rotating vanes and the curved wall of the shell, of a curved projection located in said chamber at the adjoining faces of the rotating and stationary vanes and overlapping axially the clearances between such vanes, substantially as and for the purpose set forth.

18. In an axial-flow elastic-fluid turbine, the combination with the shell, rotating and stationary vanes therein, and a chamber between the vanes and the shaft, of a curved projection located in said chamber at the adjoining faces of the rotating and stationary vanes and overlapping axially the clearances between such vanes, substantially as and for the purpose set forth.

19. In an axial-flow elastic-fluid turbine, the combination with the shell, rotating and stationary vanes therein, a chamber between the rotating vanes and the curved wall of the shell, and a chamber between the vanes and the shaft, of curved projections located in both said chambers at the adjoining faces of the rotating and stationary vanes and overlapping axially both the inner and outer clearances between such vanes, substantially as and for the purpose set forth.

20. In an axial-flow elastic-fluid turbine, the combination with the shell, a wheel within said shell carrying on its periphery an annular set of axial-flow buckets, a cover for the outer ends of said buckets, a chamber or space between said bucket-cover and the surrounding curved wall of the shell, and a stationary turbine element delivering the elastic fluid axially to or receiving it axially from said wheel-buckets, of a curved projection from said stationary turbine element located in said chamber and overlapping axially the clearance between said stationary element and the cover of the wheel-buckets, substantially as and for the purpose set forth.

21. In an axial-flow elastic-fluid turbine, the combination with the shell, a wheel within said shell carrying on its periphery an annular set of axial-flow buckets, a set of stationary intermediate buckets receiving the elastic fluid axially from or delivering it axially to said wheel-buckets, a cover for the inner ends of said stationary buckets, and a chamber or space between said cover and the shaft of the turbine, of a curved projection from the cover of the stationary buckets in said chamber and overlapping axially the clearance between said cover and the inner adjoining rim of the wheel-buckets, substantially as and for the purpose set forth.

22. In an elastic-fluid turbine, the combination with a rotating wheel having a rim pierced laterally by vane-passages, and a stationary element adjoining one side of such rim and delivering the elastic fluid to or receiving it from the revolving vane-passages parallel with the axis of such wheel, of cylindrical surfaces both on the outer and inner sides of said rim and adjoining such stationary element, and projections from such stationary element overlapping such cylindrical surfaces on lines concentric with the axis of rotation, and having a small clearance from such cylindrical surfaces, substantially as set forth.

23. In an elastic-fluid turbine, the combination with the shell, a rotating wheel therein carrying lateral vane-passages, and a delivery-nozzle entering the shell in line with such vane-passages, of curved projections at the adjoining faces of the nozzle end and wheel-rim overlapping axially the adjoining part on lines concentric with the axis of rotation, whereby the clearances between the nozzle and rotating vanes will be transferred from the radial to the cylindrical surfaces, substantially as set forth.

24. In an axial-flow elastic-fluid turbine, the combination with the shell, relatively rotating elements within the shell, and a chamber between the inner clearances and the shaft, of a curved projection located in said chamber at the adjoining faces of the relatively rotating elements and overlapping axially the inner clearances between such elements on lines concentric with the axis of rotation, whereby the clearances between the relatively rotating elements will be transferred from the radial to the cylindrical surfaces, substantially as set forth.

25. In an axial-flow elastic-fluid turbine, the combination with the shell, a set of rotating vanes therein, and a nozzle entering the shell and delivering the elastic fluid to the rotating vanes, of a curved projection overlapping axially the clearances between the nozzle and the rotating vanes on the inner side of such elements, on lines concentric with the axis of rotation, whereby the clearances between the nozzle and rotating vanes will be transferred from the radial to the cylindrical surfaces, substantially as set forth.

This specification signed and witnessed this 25th day of July, 1904.

CHAS. G. CURTIS.

Witnesses:
JNO. ROBT. TAYLOR,
JOHN L. LOTSCH.